United States Patent [19]

Harris

[11] 3,997,309

[45] Dec. 14, 1976

[54] COOLING TUBE SUPPORT SYSTEM FOR FIBERIZING BUSHING

[75] Inventor: Walter William Harris, Toledo, Ohio

[73] Assignee: Johns-Manville Corporation, Denver, Colo.

[22] Filed: July 31, 1975

[21] Appl. No.: 600,651

[52] U.S. Cl. .................. 65/12; 65/172; 65/374 M

[51] Int. Cl.² .......................... C03B 37/02

[58] Field of Search .............. 65/2, 11 W, 12, 27, 65/172, 171, 173, 374 M

[56] References Cited
UNITED STATES PATENTS

| | | |
|---|---|---|
| 3,251,665 | 5/1966 | Bour .......................... 65/12 X |
| 3,457,148 | 10/1969 | Higginbotham .................. 65/27 X |
| 3,647,382 | 3/1972 | Tilbrook ........................ 65/12 |
| 3,726,655 | 4/1973 | Mitcham ....................... 65/27 X |

Primary Examiner—Robert L. Lindsay, Jr.
Attorney, Agent, or Firm—Robert M. Krone; Joseph J. Kelly; John H. Miller

[57] ABSTRACT

Improved corrosion resistant cooling tube support members are provided for fiberizing bushings used to make fibers from molten inorganic material such as glass. The support members allow an operator to replace defective cooling tubes relatively easily without cooling down the bushing and without requiring assistance from a second operator.

8 Claims, 5 Drawing Figures

U.S. Patent    Dec. 14, 1976    3,997,309
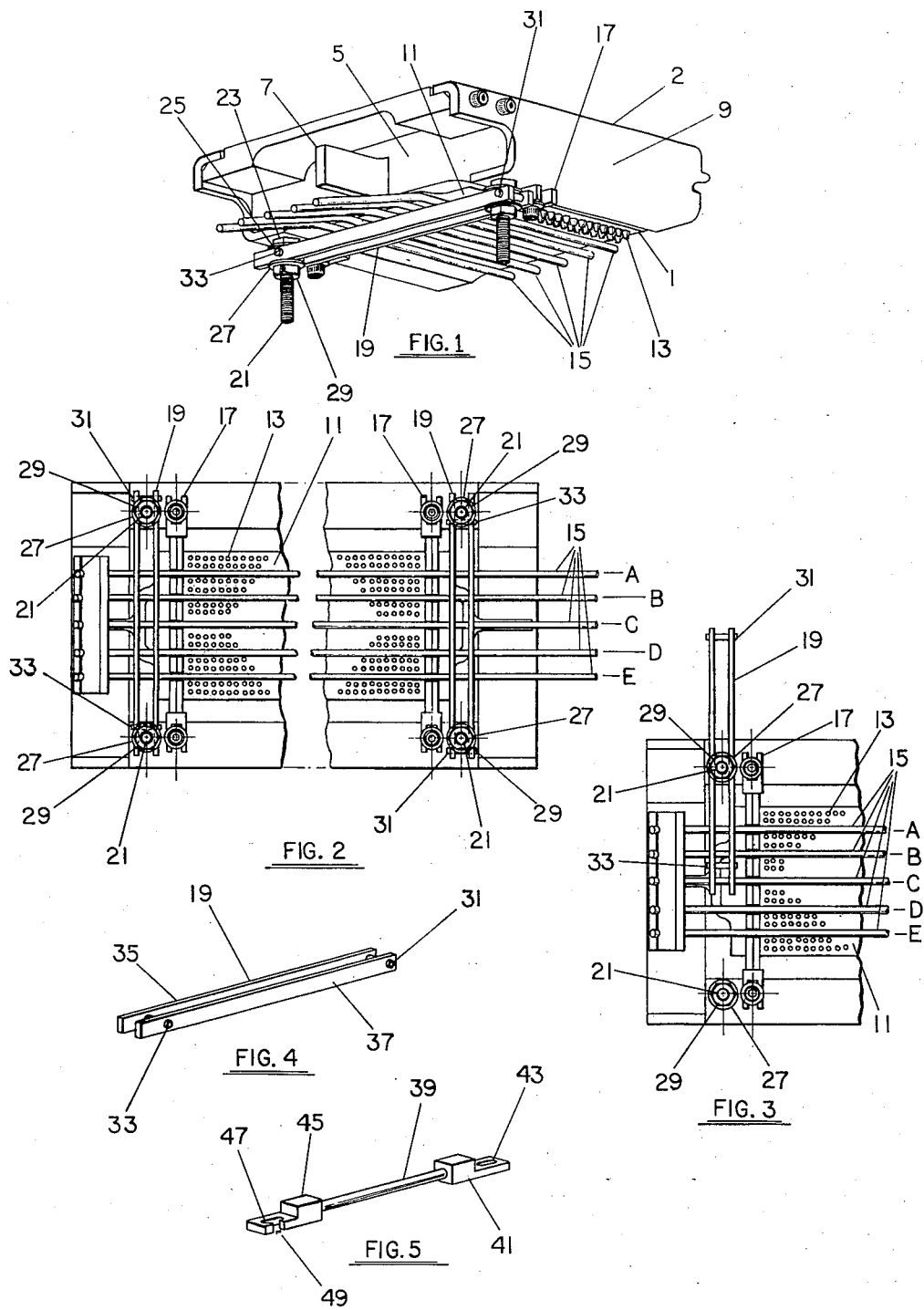

COOLING TUBE SUPPORT SYSTEM FOR FIBERIZING BUSHING

The present invention relates to a support system for supporting cooling tubes beneath the orifice tip plate of a fiberizing bushing used to make fibers from a molten inorganic material, such as glass.

BACKGROUND

One well known method of making fibers from a molten inorganic material such as glass utilizes a bushing having a plurality of orifice tips. The molten material flows from the bushing out through the orifice tips forming cones at the ends of the tips. When the temperature of the molten material at these cones is properly controlled, continuous fibers can be drawn from the tips of the cones.

One prior art manner of controlling the temperature of the cones is to place a tube adjacent to the cones and to flow a cooling medium such as water through the tube at a rate necessary to maintain desired cone temperature. Such cooling tubes must be supported in such a manner that their location with respect to the adjacent orifice tips can be controlled and held at a desired position.

The environment around the cooling tubes, including the area around the cooling tube supports, is harsh in terms of high temperature, corrosiveness caused by the temperature, volatiles from the molten material, and water spray typically used around such a bushing. This harsh environment deteriorates the cooling tubes requiring one or more to be replaced. It is desirable to replace cooling tubes without excessively cooling down the bushing. Becasue of the size of the bushing and the harsh environment, the support system for the cooling tubes would desirably be designed to permit one person to replace one or more cooling tubes in a minimum amount of time. Frequently the ends of the cooling tubes are bent downward a substantial amount to facilitate feeding and removing the cooling fluid. Furthermore, the bushings are usually arranged so close together that the cooling tubes could not be removed by pulling the tubes straight out in a horizontal plane because of interference with an adjoining bushing or other hardware located between the bushings.

Various means of supporting the cooling tubes in the past include flip down (crankshaft) supports and special holding tools to allow one person to hold all of the tubes in place while another person removed the supports and replaced one or more defective tubes. With these known cooling tube supports replacing one or more cooling tubes was a time consuming, two-man job, resulting in excessive down time, undesiable hazard and discomfort to the people doing the job, and frequent damage to good cooling tubes and/or inaccurate positioning of the cooling tubes.

The purpose of the present invention is to provide a cooling tube support that will allow one person to quickly and easily replace one or more cooling tubes and to accurately reposition the tubes a correct distance below the bottom wall of the bushing.

SUMMARY OF THE INVENTION

The present invention provides an improved support system for a fiberizing bushing with the improvement comprising a plurality of elongated rod means extending below the bottom wall of the bushing, a rod means being located adjacent to each outer-most cooling tubes at each end of the bushing, a cooling tube support member for spanning beneath the plurality of cooling tubes at each end of the bushing, each end portion of the support member at least partially surrounding one of the rod means, at least one end portion of said support member being movable laterally with respect to the elongated rod means which the end portion at least partially surrounds, and means for moving the end portions of the support members along the elongated rod means whereby the cooling tubes can be properly spaced from orifice tips on the bottom wall of the bushing.

The invention further provides cooling tube support members more resistant to the corrosive environment present below glass fiberizing bushings, the supports being made from molybdenum alloys preferably containing a major amount of molybdenum and minor amounts of titanium, zirconium, and carbon. Several configurations of cooling tube supports are suitable, but the preferred support comprises to parallel bars of alloy spaced apart and held together with a pin located in each end portion, the pin in one end portion being nearer the that end of the support than the pin in the other end portion is to its end of the support.

BRIEF DESCRIPTION OF THE DRAWINGS

FIG. 1 is a partial perspective view of a typical conventional fiberizing bushing showing the present invention in place.

FIG. 2 is a plan view of the bottom wall or tip plate of the bushing shown in FIG. 1.

FIG. 3 is a partial plan view of the bushing shown in FIG. 2 with the cooling tube support withdrawn to remove support from some of the cooling tubes while still providing support for the remainder of the cooling tubes.

FIG. 4 is a perspective view of a preferred cooling tube support used in the present invention.

FIG. 5 is a perspective view of another cooling tube support usable in the present invention.

DETAILED DESCRIPTION AND PREFERRED EMBODIMENTS

Referring to FIG. 1, the improved cooling tube support system is used with a conventional fiberizing bushing 1 suitable for making fibers from inorganic molten materials. The bushing 1 is supported on conventional bushing supports 2 located at each end of the bushing. The bushing 1 has two end wall for attaching electrical leads to feed power to the resistance heated bushing. The bushing has two end walls 5, each containing a lug 7 for attaching electrical leads (not shown), sidewalls 9, and a bottom wall or tip plate 11. The tip plate 11 contains a plurality of orifices, each of which is surrounded by a tip 13 extending below the tip plate 11.

A plurality of cooling tubes 15 are spaced along the width of the tip plate 11 in such a manner that each row of tips 13 is adjacent to a cooling tube and each cooling tube is adjacent to two rows of tips, one row on each side of the cooling tube. The alignment and spacing of each cooling tube with respect to the tips adjacent to the cooling tube is important. Proper alignment is maintained with alignment members 17 which have slots or notches at proper intervals across their length. The cooling tubes fit into these notches. The notches in sequential alignment members are aligned and this positions the cooling tubes properly and maintains the tubes in this arrangement.

The cooling tubes are held in the notches in the alignment members by cooling tube supports 19 which in turn are held in position by bolts 21, washers 27, 25, and upper and lower nuts 23 and 29 respectively. Preferably the washers 25 and 27 are attached to the nuts 23 and 29 by any suitable manner, e.g. by brazing, pins, etc., particularly upper washers 25. This prevents the washers from causing problems for the operator when changing cooling tubes as will become apparent later.

The cooling tubes 15 are maintained at the proper position below the tip plate 11 by adjusting the upper nuts 23 to the correct position and then by bringing the support members 19 snug against the upper washers 25 by the use of the lower washers 27 and the lower nuts 29.

In the preferred embodiment shown in FIGS. 1, 2 and 4, the support membes 19 comprise two bars 35 and 37 held in a spaced apart position by two pins 31 and 33. For economical reasons, conventional groove or spring pins are preferred. The ends of these pins are smaller in diameter than the central portion thus forming shoulders that butt against the inside surfaces of bars 35 and 37 to maintain the desired spacing between the bars. The smaller diameter ends of the pins fit tightly into holes drilled into the bars 35 and 37. By selecting a pin material having a higher coefficient of thermal expansion than the bars, such as stainless steel pins and molybdenum alloy bars, the fit becomes even tighter when the support is exposed to elevated temperatures in service.

While the bars 35 and 37 shown in FIGS. 1, 2, and 4 are rectangular in cross-section, their shape is not critical so long as the surface or surfaces supporting the cooling tubes lie in a sngle place. The heighth dimension of the bars 35 and 37 should be sufficient to prevent bowing in service, but not so great as to interfere with the proper spacing of the cooling tubes from the tip plate. For round cooling tubes having an outside diameter of 0.16 inches the bars are typically 0.375 inch high by 0.25 inch wide.

As shown in FIG. 1 the cooling tubes 15 are usually bent downward on at least one end to facilitate their connection to lines bringing cooling fluid, usually water, to the cooling tubes.

The opposite ends of the cooling tubes are frequently open. Water flowing freely from the open ends into a catch basin readily indicates that the tubes are not plugged. The present invention is particularly benficial in changing tubes having at least one bent down end.

As shown in FIG. 4, the pin 31 is closer to its respective end of the support member than is the pin 33. The purpose of this arrangement is to permit the support member to be slid out from under at least one of the cooling tubes after the lower nuts 29 are loosened to facilitate replacing a cooling tube (see FIG. 3). The withdrawn support member is still restrained by one lower nut so that the support member prevents the remaining cooling tubes from falling down.

As shown in FIG. 2, the cooling tube support member on the left hand end of the bushing is orientated 180° different than the tube support at the right hand side of the bushing. Thus the tube support member at one end of the bushing is slid and withdrawn in one direction whereas the tube support member at the other end of the bushing is slid and withdrawn in the opposite direction.

Referring to FIG. 3, when it is desirable to replace one or more of the cooling tubes C, D, or E the procedure is as follows. First the four lower nuts 29 are loosened sufficiently to allow the left hand support member to be slid and withdrawn and the cooling tubes C, D, and E to be slid and withdrawn from the right hand tube support member. Although it is not necessary to reduce the temperature of the bushing before beginning this procedure, the temperature can be reduced somewhat, e.g. 100°–200° F, for the convenience of the operator. The temprature should not be reduced below that necessary to maintain a continuous flow of molten material through the orifice tips 13. High speed drawing of the fiber is discontinued, but the fiber drawing continues at a much slower rate due to the low viscosity of the molten cones at the end of the tips and gravity.

Second, the left hand tube support member is slid back and withdrawn sufficiently to remove support from the tube or tubes to be replaced. If the defective tube is D or C, the operator must hold tube E or tubes E and D respectively with a rod, appropriate tool, or with a thermally protected hand or finger (asbestos glove) until the defective tube has been removed. Once the defective tube is exposed it is lowered at the left hand side sufficiently so that it clears obstructions and allows the other end of the tube to be slid out of the other tube support member, on the right side of the bushing. The water line is left connected to the defective tube while it is being removed to keep it cool and to prevent any molten material that may come in contact with the tube during this procedure from sticking to the cooling tube.

Next, a new or repaired cooling tube, also connected to a flowing cooling fluid, is put in place by reversing the above described steps. If it is desirable for the operator to do something requiring both hands after removing the defective tube and before inserting the new tube, he merely slides the left hand support member back into the position it was in after the first step and leaves it there until he is ready to insert the new tube. Earlier it was mentioned that it was desirable to have particularly the upper washers fastened to the upper nuts. This holds the upper washers up in place and prevents them from falling down on the lower washers when a tube support member is withdrawn. Otherwise, the operator would have to lift the upper washer back into place before sliding a tube support member back in place, requiring a third hand, i.e. a second person.

After the defective tubes are replaced with good tubes, the lower nuts are returned to their proper positon to properly position the support members and cooling tubes and the bushing is again ready for production.

When it is desired to replace tubes A and B the operator goes around to the opposite side of the bushing and slides the right hand (FIG. 2) support member out from under tube A or tubes A and B and repeats the above described steps where appropriate.

While the cooling tube support member 19 shown in FIG. 4 is a composite fabricated article, it could be a monolithic one piece support machined from a solid piece of alloy, made by powder metallurgy, or cast in the desired shape.

Another less preferred cooling tube support member is shown in FIG. 5. This support member comprises an end portion 41 having a slot 43 therethrough, an end portion 45 having a T-shaped slot 47 therethrough with one leg of the slot 47 forming an opening 49 to the outside, and a tube support section 39 spanning between the two end portions. The requirements of this tube support member are the same as for the support member shown in FIG. 4, but it is withdrawn in a different manner. After loosening the lower nuts 29, this support member is pivoted laterally about the bolt 21 passing through the slot 43 in such a manner as to cause the bolt 21 normally passing through slot 47 to pass through the opening 49. Pivoting is continued until support is withdrawn from the defective cooling tube.

In the development of the above described apparatus for the manufacture of glass fibers, the life of the support members 19 was limited severely by the extremely hostile and corrosive enrivonment that exists beneath a glass fiberizing bushing. Corrosion takes place more rapidly at the points or areas of contact berween the support members 19 and the cooling tubes 15. The exact reason for this accelerated corrosion is not known, but it is thought to have been caused by electrolytic (galvanic) action between the noble platinum-rhodium alloy cooling tubes and the less noble Inconel or stainless steel support members, another type electrolytic corrosion known as "contact" or "concentration cell" corrosion, or both. Corrosion of the support members caused misalignment of the cooling tubes and eventual failure of the support members.

Many materials were used for making the cooling tube support members including Inconel 600, 316, 304, and 330 stainless steels, mullite, ceramic flame spayed metal, copper, brass and other cinluding pure molybdenum. All except the pure molybdenum suffered excessive corrosion. The pure molybdenum was brittle and many such support members broke in handling under production type conditions.

A preferred material for use in the cooling tube support members that is more durable than pure molybdenum is MT-104, a molybdenum alloy available from GTE-Sylvania typically containing about 99.2% (by weight) molybdenu, 0.4–0.55% titanium, 0.06–0.12% zirconium, and 0.01–0.04% carbon. Ductility of this alloy is about 15 to 40% depending on the temperature.

Other molybdenum alloys containing one or more of the metals niobium, titanium, vanadium, carbon, zirconium, tungsten and rhenium should also be suitable for use in the cooling tube support members, but are either more expensive or more brittle than the preferred alloy. For example, an alloy containing about equal amounts of molybdenum and rhenium would probably be more resistant to corrosion, but would be much more costly.

The above described invention provides cooling tube support having a much longer life than prior art supports. There supports are simple to fabricate or form and permit one operator to relatively easily replace cooling tubes without cooling down the bushing and without requiring any assistance from a second operator.

What I claim is:

1. In a fiberizing bushing for making fibers from a molten inorganic material comprising a bushing for containing the molten material, said bushing having a bottom wall containing a plurality of rows of orifices and orifice tips surrounding said orifices, a plurality of cooling tubes for cooling said rows of orifice tips, alignment means for aligning said cooling tubes, and support means for supporting said cooling tubes; the improvement comprising:
   a. said support means comprising a plurality of elongated rod means extending below the bottom wall of the bushing, a rod means being located adjacent to each outer-most cooling tube at each end of the bushing,
   b. a cooling tube support member for spanning beneath said plurality of cooling tubes at each end of said bushing, each end portion of said support member at least partially surrounding one of the elongated rod means, at least one end portion of said support member being movable laterally, with respect to the elongated rod means which said end portion at least partially surrounds, and
   c. means for moving the end portions of said cooling tube support members along said elongated rod means whereby said cooling tubes can be properly spaced from the said bottom wall.

2. The apparatus as defined in claim 1 wherein means (a) are threaded rods.

3. The apparatus as defined in claim 2 wherein means (c) are nuts compatible with said threaded rods.

4. The apparatus as defined in claim 1 wherein said means (b) contains slots through which means (a) extend, said slots being so arranged to allow means (b) at one end of said bushing to be moved laterally in a first direction a sufficient amount to withdraw support from at least one of the outermost cooling tube and to allow means (b) at the other end of said bushing to be moved in a second direction a sufficient amount to withdraw support from at least the other outermost cooling tube, said first direction being opposite to said second direction.

5. The apparatus of claim 1 wherein when said one end portion of means (b) is moved laterally the opposite end portion rotates about the means (a) which it at least partially surrounds.

6. The apparatus of claim 1 wherein means (b) is made from a molybdenum alloy and said cooling tubes are made from a platinum rhodium alloy.

7. The apparatus of claim 6 wherein said molybdenum alloy contains a major amount of molybdenum and minor amounts of titanium, zirconium, carbon, and trace elements and has a ductility of about 15–40%.

8. The apparatus of claim 6 wherein said alloy contains about equal amounts of molybdenum and rhenium.

* * * * *